J. H. SCOTT.
AUTOMOBILE LOCK.
APPLICATION FILED OCT. 7, 1919.

1,360,692. Patented Nov. 30, 1920.

INVENTOR
JOSEPH H. SCOTT
BY Strong & Townsend
ATTORNEYS

UNITED STATES PATENT OFFICE.

JOSEPH H. SCOTT, OF SAN FRANCISCO, CALIFORNIA.

AUTOMOBILE-LOCK.

1,360,692.   Specification of Letters Patent.   Patented Nov. 30, 1920.

Application filed October 7, 1919. Serial No. 329,096.

*To all whom it may concern:*

Be it known that I, JOSEPH H. SCOTT, a citizen of the United States, residing at the city and county of San Francisco and State of California, have invented new and useful Improvements in Automobile - Locks, of which the following is a specification.

This invention relates to an automobile lock and particularly pertains to means whereby the steering mechanism of an automobile is held against operation.

Due to an insistent demand by the automobile trade for a simple lock which will effectively secure a vehicle in a manner to prevent it from being driven away by unauthorized persons numerous contrivances have been provided which act to secure various portions of the operating mechanism of the vehicle and the running gears thereof.

It is the principal object of the present invention to provide a device which is intended to meet the requirements as above mentioned, and which device is decidedly simple in its operation and construction and may be instantly applied to the steering column of an automobile, to lock the steering post against rotation, or may be readily removed from said column to permit free rotation of the shaft when desired, said lock being fitted with a suitable key controlled mechanism which insures that it cannot be removed from the steering column when set in its locked position.

The present invention contemplates the use of a hinged shackle carrying a lock pin which is adapted to protrude through the outer steering column and the wall of the steering post, to lock them against movement in relation to each other, said shackle encompassing the steering column and its free ends being held by a suitable key lock mechanism.

The invention is illustrated by way of example in the accompanying drawings, in which—

Referring more particularly to the drawings, 10 indicates the steering post of an automobile, which post telescopes within an outer steering column or casing 11. It is understood that in the ordinary automobile construction, the post 10 is formed at its lower end with a crank member and is secured at its upper end to a steering wheel by which structure the crank may be manipulated. The steering column is normally secured to the dashboard of the vehicle and provides a bearing at its upper end for the wheel. As the steering column is normally fixed in relation to the vehicle body, it will be evident that by locking the steering post in relation thereto, the steering mechanism may be held and the running gear of the vehicle placed out of control by the steering wheel.

Figure 1:
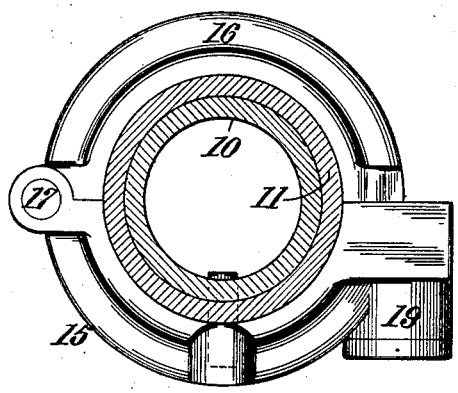
Figure 1 is a view in plan, showing a steering column and its shaft in section, and further disclosing the application of the present invention thereto.
Figure 2:
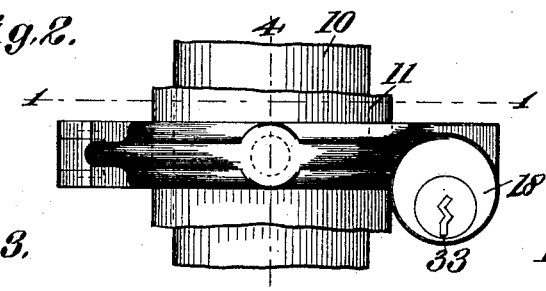
Fig. 2 is a fragmentary view in side elevation, showing portions of the steering column and the lock applied thereto, more clearly showing the position of the barrel lock structure.
Figure 3:
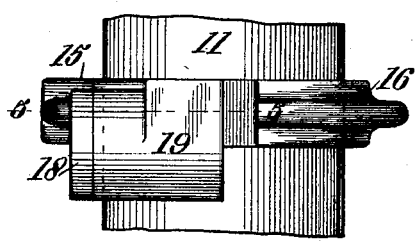
Fig. 3 is a view in elevation, showing the lock in another view.
Figure 4:
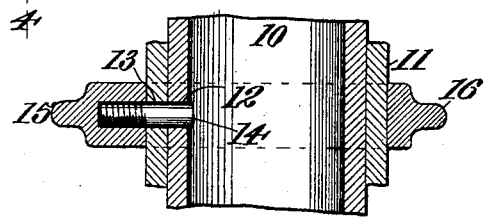
Fig. 4 is a view in central, vertical section through the lock and steering column, showing the manner in which the steering column and steering post are locked against rotation.
Figure 5:
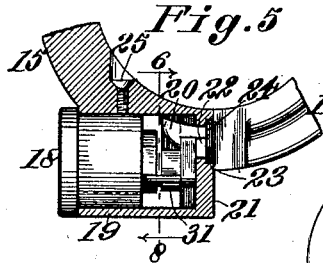
Fig. 5 is a fragmentary view of the lock shackle, shown partly in section, and disclosing the manner in which the two free ends of the shackle are held by the lock mechanism.
Figure 6:
Fig. 6 is a view in transverse section through the lock on line 6—6 of Fig. 5, as seen in the direction of the arrow.
Figure 7:
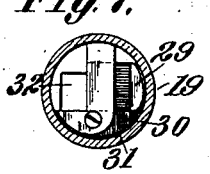
Fig. 7 is another view of the lock barrel shown in Fig. 6.

In the present instance this is done by boring a hole 12 through the steering post and a hole 13 through the steering column, these holes being in register when it is desired to lock the vehicle. The locking action is produced by a pin 14 which is intended to extend through these two holes when they are in register. The pin 14 is carried by a semi-circular shackle member 15, which combines with another shackle member 16 to form a complete circular shackle adapted to embrace the steering column. These two shackle members 15 and 16 are hinged together by a pin 17. Their opposite ends are adapted to swing free when desired and may be locked in relation to each other by a suitable barrel lock 18. The shackle member 15 carries the pin 14 at a point midway its circumferential length and extending radially therefrom. The shackle member 15 is also formed at its free end with an enlarged cylindrical boss 19, into which the barrel lock 18 is seated. The boss extends with its central, longitudinal axis tangential to the circumference of the shackle, as more clearly shown in Fig. 5 of the drawings. Upon the free end of the shackle member 16 is a bolt 20, which is formed with a hook and is adapted to project into the hollow portion of the boss 19 to there be locked by the mechanism closed thereby. The boss 19 is formed with an end wall 21, having a central opening 22 therethrough. This opening is provided to accommodate the bolt or tongue 20, which is projected therethrough and into engagement with the lock.

It will be noted that the opening 22 is counterbored, as indicated at 23, and receives a reduced shoulder portion 24 formed upon the free end of the member 16. This forms a joint which it would be very hard for a person to break open and which would act to prevent a chisel from being inserted between the free ends of the shackle members 15 and 16 to cut the bolt 20 in two.

Figure 9:
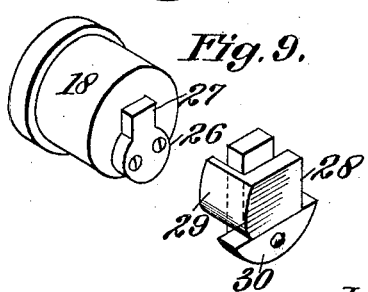
Fig. 9 is a view showing a schematic arrangement of the parts of the lock in the manner in which they are assembled.
Figure 8:
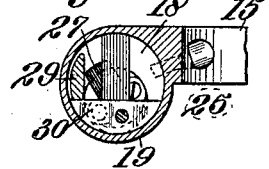
Fig. 8 is a transverse section through the lock structure, as seen in the direction of arrow 8 in Fig. 5.

Reference being had to Figs. 5 to 9 inclusive, the lock structure will be readily understood. It will be seen that the barrel 18 is inserted within the boss 19 and is there secured by a screw 25, which is placed in position from the inside of the shackle member 15 and will thus be completely concealed when the lock is in its position upon the steering column. Mounted upon the barrel is a cam member 26, which carries an eccentrically disposed projection 27. This member is adapted to be rotated against a catch bolt 28, which is slidable across the end 21 of the bossed portion within which the barrel is inclosed. This bolt, as shown in Fig. 9, is formed with a main body portion moving transversely of the barrel, and an extending portion 29, which is at right angles to the body portion and against which the protruding end 27 of the cam 26 is adapted to strike, this action being more clearly shown in Fig. 8. The bolt is held in its path of travel by means of a guide member 30, which is mounted within the end of the barrel and registers with the catch bolt 28 in the manner shown in Fig. 9.

The catch member 28 is provided with a spring 31, which normally holds it partially across the opening 32 in the end 21 of the boss and through which opening the bolt 20 or tongue, as it might be termed, is adapted to extend. By this arrangement it will be seen that at any time the member 20 is inserted through the opening into the boss that the catch 29 will engage it and prevent its removal until after the bolt has been actuated and the catch relieved by the rotating action of the barrel and the action of the cam 26.

In operation of the present invention, it will be understood that the steering post is free to rotate within the steering column and that the bolt mechanism has been removed. When it is desired to lock the vehicle, the steering wheel is rotated until the holes 12 and 13 in the post and column respectively, are in register, after which the shackle is disposed around the steering column with the pin 14 extending through the registering holes. The shackle parts 15 and 16 may then be swung toward each other and the bolt 20 passed through the opening and into the locked position in the rear of the catch bolt 28, it being understood that this bolt has yielded to permit the enlarged head portion of the member 20 to pass through the opening and that it is now held in this position against removal. The shackle may then be removed from the steering column when a suitable key has been inserted in the keyhole 33 and the barrel thereafter rotated.

While I have shown the invention as being provided with a lock of the structure specified and applied to only lock the steering post and steering column, it will be understood that various changes might be made to insure that the locking parts may be securely held and conveniently separated, and that the steering column and other allied portions might be locked together if occasion required, without departing from the spirit of the present invention.

Having thus described my invention, what I claim and desire to secure by Letters Patent is—

1. An automobile lock including a pair of substantially semi-circular sections hingedly connected to each other at one end, a reduced shoulder formed upon the opposite end of one of the sections, a hook extending out from the shoulder, the opposite end of the other section having a tangential cut-out, a barrel casing tangentially disposed around the cut-out of said opposite end of the other section and being integral therewith and having one end flush with the said opposite end of the other section, said casing end having a counterbored part forming a wall to receive said reduced shoulder, the latter abutting the wall, said wall having an opening to receive the hook, a lock in the casing to engage the hook, and means whereby said sections hold the steering post against rotation.

2. An automobile lock including a pair of substantially semi-circular sections hingedly connected to each other at one end, the opposite end of one section having a tangential cut-out, a barrel casing tangentially disposed around the cut-out of said opposite end of one section and being integral therewith and having one end flush with the said opposite end of said section, the opposite end of the other section being formed to snugly and tightly engage the said end of the casing and the said opposite end of the first named section, a bolt directly borne by the said opposite end of the first named section and receivable in the casing and cut-out, a lock in the casing and cut-out to engage the bolt, and means whereby the sections hold the steering post against rotation.

In testimony whereof I have hereunto set my hand in the presence of two subscribing witnesses.

JOSEPH H. SCOTT.

Witnesses:
   JAMES M. ABBETT,
   RUFUS H. KIMBALL.